United States Patent Office 3,127,235
Patented Mar. 31, 1964

3,127,235
METHOD OF FORMING AND MAINTAINING
FILMS ON SURFACES OF LIQUIDS
Wolfgang Benzel, Haan, Rhineland, Germany, assignor to
Dehydag Deutsche Hydrierwerke G.m.b.H., Dusseldorf,
Germany, a corporation of Germany
No Drawing. Filed Oct. 28, 1960, Ser. No. 65,571
Claims priority, application Germany Nov. 6, 1959
7 Claims. (Cl. 21—60.5)

This invention relates to a method of forming and maintaining a thin, permanent film on the surface of a liquid.

Films of substance, such as antifoaming agents, pest control agents, covering agents for prevention of evaporation, and difficultly soluble surface active agents for reducing surface tension, are often applied to the surface of a liquid to perform their functions. These films have been formed in the prior art by spraying the substance on the surface of the liquid to be covered and allowing the substance in liquid form to gradually spread on the surface of the liquid. These methods have not been satisfactory as the maintenance of thin permanent layers of these substances is difficult due to evaporation of the substance or disruption of the surface of the liquid by agitation, for example. Therefore, large quantities of the film-forming substance had to be sprayed or placed on the surface of the liquid and had to be continuously repeated to maintain the film.

It is an object of the invention to provide a novel and economical method for forming and maintainig thin, permanent films on the surface of liquids.

It is an object of the invention to provide a novel method of distributing materials as films on the surface of liquids.

These and other objects and advantages of the invention will become obvious from the following detailed description.

The method of the invention comprises impregnating porous bodies which are capable of floating on the surface of the liquid to be covered with the active substance that is to form the film on the surface of the liquid and distributing the impregnated porous bodies on the surface of the liquid to be covered whereby a uniform, permanent film of the active substance is formed on the surface of the liquid. If the film is destroyed by agitation of the liquid or by evaporation of the film from the surface of the liquid, the active substance contained in the impregnated porous bodies is released and spreads again over the surface of the liquid to reform the desired film.

The porous floating bodies may be composed of inorganic or organic materials such as pumice stone, glass foam, spongelike materials such as polyvinyl chloride or rubber, synthetic foams such as polystyrene foam, polyurethane foams, blown urea or melamine resins, and the like. They may be solid bodies or bodies made of pressed, glued or sintered powders or granules. The absorption and releasing capacity of the porous bodies depends upon the size and type of the pores, the active substance, the liquid surface and external conditions, and the volume of the pores can be adapted to the surrounding conditions.

The shape of the porous bodies is not critical and they may be granules, spheres, disks, chips, etc., or may cover the entire surface in a single coherent body. Single coherent bodies in the form of mats made of elastic synthetic foam materials are suitable preferably for covering surfaces of liquids in fermentation vats or the like. It is also possible to anchor such mats on stationary or flowing waters. Such mats are in many cases particularly advantageous because of their ease in handling and their capability of being reused several times.

The porous bodies are impregnated by immersing them in the active substance either at atmospheric pressure or in a partial vacuum, by spraying the impregnating solution thereon, or by other suitable means. The impregnated bodies are then distributed on the surface of the liquid. The distribution of the porous bodies need not be even as a sporadic distribution is sufficient in most instances to achieve the desired effect. When the impregnated bodies have lost their effectiveness, they may be separated from the liquid, cleaned and re-impregnated for reuse.

The film is formed with small amounts of the active substance and is maintained over a long period of time even if the liquid is in motion. The impregnated porous bodies act as storage reservoirs for the active substances from which the active agents spread over the liquid surface to form the desired film and will replenish the film when it is destroyed by evaporation, agitation, or some other means. It is known that films will form on the surface of liquids such as water when an active substance such as oleic acid is placed on the liquid's surface, as the active substances tend to spread out. By the method of the present invention the film is quickly formed due to the numerous porous bodies.

The method of the invention has many applications in industry and can be used wherever the formation of films on liquid surfaces is desired. The method is extremely useful in breaking undesirable foams or to prevent the formation of said foams. The foams are frequently found in processes where surface-active agents are used for other than foaming purposes such as a wetting agent. Foam forming albumins occur in glue manufacture, the paper and rubber industry, fermentation processes in breeding micro-organisms in ventilated tanks, treatment of waste water, etc. The impregnated porous bodies may be introduced into the industrial process systems in the overflow containers or discharge tubes of centrifuges or presses, in the overflow of clarifying devices, in distillation or evaporation apparatus, in agitation vessels, and the like.

The method of the invention is also useful for applying films of pest control agents to liquid surfaces for insect control in natural waters such as swamps. Since the conservation of water in reservoirs in arid regions is performed by covering the water with a layer of oil, high molecular fatty alcohols, etc., to prevent evaporation of the water, the invention can also be applied to this process.

The active substances useful for these and other purposes are known. Antifoaming agents are, for example, saturated and unsaturated fatty alcohols and fatty acids with a chain length of 6 to 18 carbon atoms and their salts, such as octyl alcohol, oleic acid, animal or vegetable oils and fats, cholesterin, aluminum stearate, polysiloxanes known under the trade-name "silicones," and the like. Suitable for combatting pests which live near the surface of water are mineral oils, chlorinated hydrocarbons, such as dichloro-diphenyl-trichloroethane, hexachlorocyclohexane, and other insecticides. Difficultly soluble, surface active agents, such as ethylene oxide addition products of higher aliphatic alcohols and acids having 6 to 18 carbon atoms, are employed especially for combatting mosquito larvae. Examples of covering agents or evaporation reducing agents are mineral oils and higher aliphatic alcohols with a chain length of 10 to 18 carbon atoms, such as hexadecyl alcohol and dodecyl alcohol.

The active agents are employed as such or in admixture with fatty or oily substances, solvents, emulsifiers, synergistically acting substances, and the like, for impregnating the floating bodies. Furthermore, the floating bodies may be dyed with a warning color or a repellent color for the purpose of warning humans or domestic animals.

The intensity and period of effectiveness of the impregnated bodies may be varied by a suitable choice of the active agents in relation to their solubility and their diffusion capabilities as well as by the addition of dispersion and emulsifying agents. The following examples represent a selection of the numerous possibilities of use.

In the following examples there are described several preferred embodiments to illustrate the invention. However, it should be understood that the invention is not intended to be limited to the specific embodiments.

*Example I*

A thin plate about ½ cm. thick and composed of elastic, poly-urethane foam with large pores was immersed in a 10% solution of a silicone-based defoaming agent in carbon tetrachloride. After separation of the excess solution, about 10% by weight of the solution remained in the synthetic foam, which corresponds to a quantity of about 10 mgm. of antifoaming agent per gram or 2 mgm. of antifoaming agent per square centimeter of foam material. The plate was cut up into small pieces of 1 $cm.^2$, which were distributed on the surface of a strongly foaming solution of a surface-active substance in an agitating vessel. The foam was spontaneously destroyed and during stirring the foam formation was prevented for a long period of time.

*Example II*

Small spheres of polystyrene foam of about 5 mm. in diameter were impregnated with a 10% emulsion of an antifoaming agent concentrate consisting of 15% of a silicone-based defoaming agent, 5% of the addition product of 8 mols of ethylene oxide and 1 mol of a fatty alcohol mixture with a chain length of 10 to 18 carbon atoms derived by hydrogenation of coconut oil and 80% carbon tetrachloride in water. After removal, the spheres contained 15 mgm. of anti-foaming agent per gram of synthetic material. With the aid of these impregnated spheres a very rapidly acting, anti-foaming effect was achieved on foaming surfaces.

*Example III*

The same polystyrene spheres as in Example II were soaked in a 10% solution of hexadecyl alcohol in ethanol. The impregnated spheres were suitable for the formation of a hexadecyl alcohol layer on water surfaces as a protection against evaporation of the water.

*Example IV*

Granulated pumice stone was impregnated with a 10% solution of dichlorodiphenyl trichloroethane and 5% of the addition product of 5 mols of ethylene oxide to 1 mol of oleyl alcohol in carbon tetrachloride. After separation of the impregnated granules, the impregnated material was suitable for eradication of insect larvae on surfaces of contaminated natural bodies of water. It formed a film of active agent which completely killed all insect larvae in the vicinity of the surface of the water within a short period of time.

*Example V*

An elastic polyurethane foam mat with an average pore diameter of about 2 mm. was impregnated by immersion and subseqeunt squeezing with a 5% solution of a semi-solid, pasty silicone in carbon tetrachloride. The plate was placed on the surface of a foaming fermentation batch in a fermentation vat. Foam formation was practically completely eliminated for the period of the fermentation process. If desired, the plate may be re-impregnated and reused.

*Example VI*

A coarse pumice stone granulate was sprayed with a concentrated solution of a fatty acid distillation residue in a chlorinated hydrocarbon solvent. The impregnated granulate was used for combatting foam formation in clarifying tanks. It was removed by means of screens and after re-impregnation was reused.

*Example VII*

Polystyrene foam spheres having a diameter of about 3 to 5 mm. were used for combatting Aedes and Anopheles larvae. The spheres had been impregnated with a 20% aqueous emulsion of an addition product of 3 mols ethylene oxide to oleyl alcohol. The impregnated spheres were dropped onto surfaces of natural waters from an airplane.

Various modifications of the method of the invention may be made without departing from the spirit or scope thereof, and it is to be understood that the invention is limited only as defined in the appended claims.

I claim:

1. In the method of forming thin films of difficultly-soluble, interface-active substances selected from the group consisting of anti-foaming agents, pesticides and evaporation reducing agents, the improvement which comprises distributing on the surface of the liquid to be covered buoyant porous bodies impregnated throughout with the active substance whereby a thin film of the active substance is formed on the surface of the liquid as it is released from the porous body and maintaining the said film of active substance by release of additional active substance from the porous body.

2. The method of claim 1 wherein the active substance is in solution in an inert solvent.

3. The method of claim 1 wherein the active substance is dispersed as an emulsion in an inert solvent.

4. The method of claim 1 wherein an emulsifying agent is in admixture with the active substance.

5. The method of claim 1 wherein the active substance is an anti-foaming agent selected from the group consisting of polysiloxanes, saturated and unsaturated aliphatic alcohols having 6 to 18 carbon atoms and saturated and unsaturated fatty acids and salts thereof having 6 to 18 carbon atoms.

6. The method of claim 1 wherein the active substance is a pesticide for combatting pests near the surface of water selected from the group consisting of mineral oils, chlorinated hydrocarbons and the reaction product from the condensation of ethylene oxide with a member selected from the group consisting of aliphatic alcohols having 6 to 18 carbon atoms and aliphatic acids having 6 to 18 carbon atoms and the liquid is water.

7. The method of claim 1 wherein the active substance is an evaporation reducing agent selected from the group consisting of mineral oils and aliphatic alcohols having 10 to 18 carbon atoms and the liquid is water.

References Cited in the file of this patent

UNITED STATES PATENTS

| | | |
|---|---|---|
| 2,170,644 | Nelson | Aug. 22, 1939 |
| 2,419,021 | Harnden | Apr. 15, 1947 |
| 2,466,826 | Romaine | Apr. 12, 1949 |
| 2,468,394 | Dinsley | Apr. 26, 1949 |
| 2,631,937 | Buss | Mar. 17, 1953 |
| 2,790,267 | Lee | Apr. 30, 1957 |
| 2,925,318 | Crawford et al. | Feb. 16, 1960 |

FOREIGN PATENTS

| | | |
|---|---|---|
| 217,139 | Australia | Sept. 18, 1958 |